D. J. BROPHY.
CLAMPING DEVICE FOR MOLDS.
APPLICATION FILED DEC. 27, 1920.
1,395,553.
Patented Nov. 1, 1921.
3 SHEETS—SHEET 1.
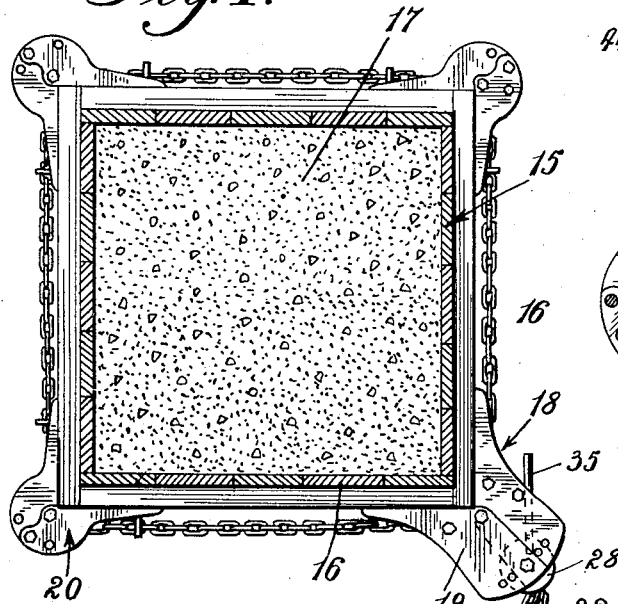
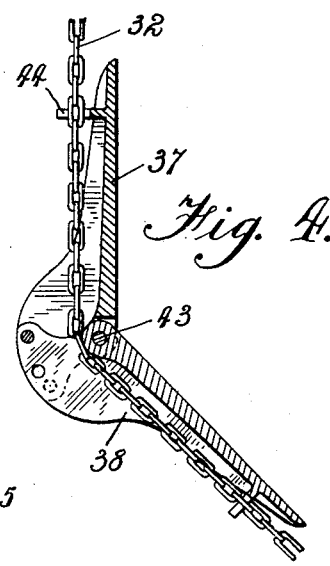
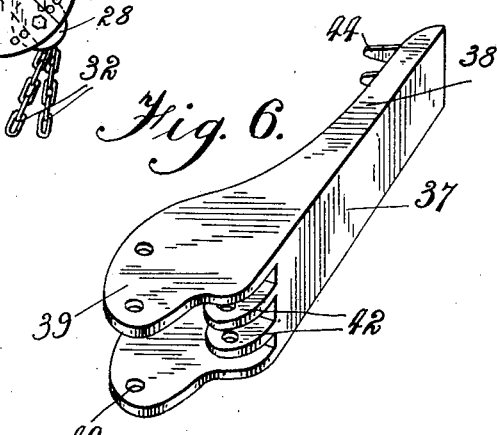
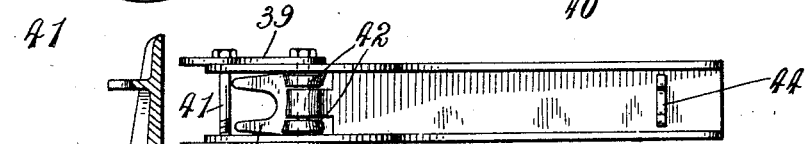
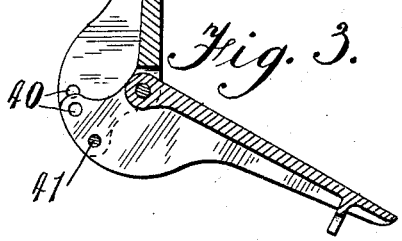
Inventor
Daniel J. Brophy
By William Clinton
Attorney

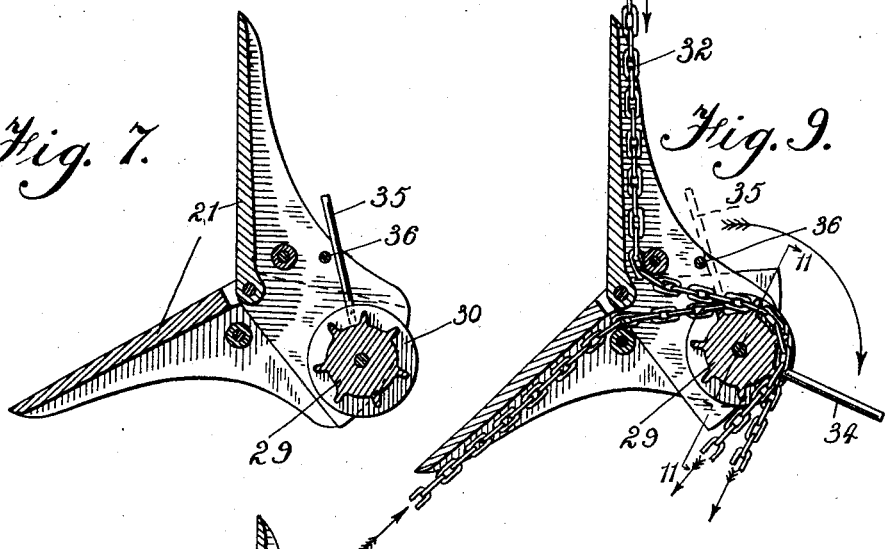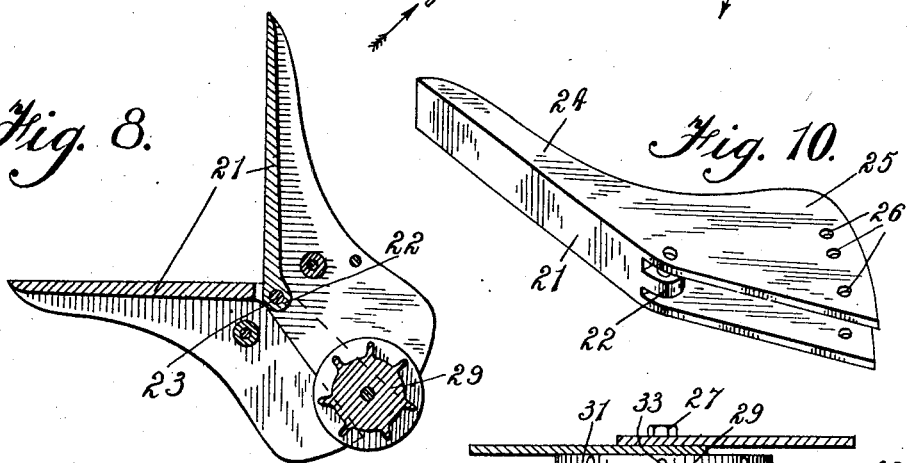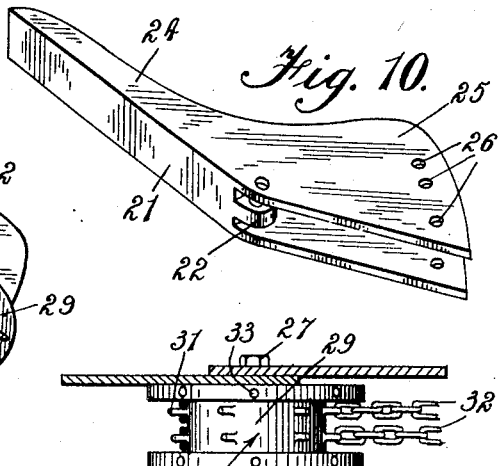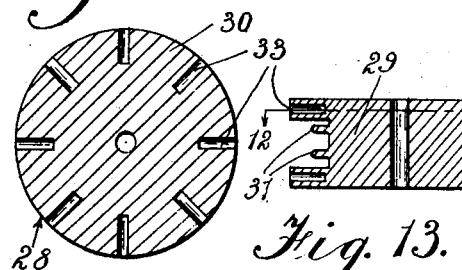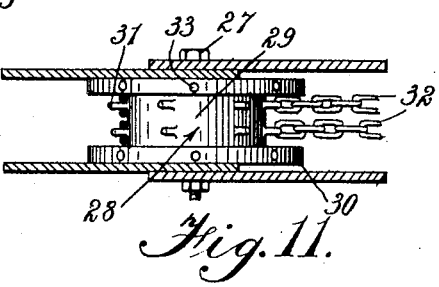

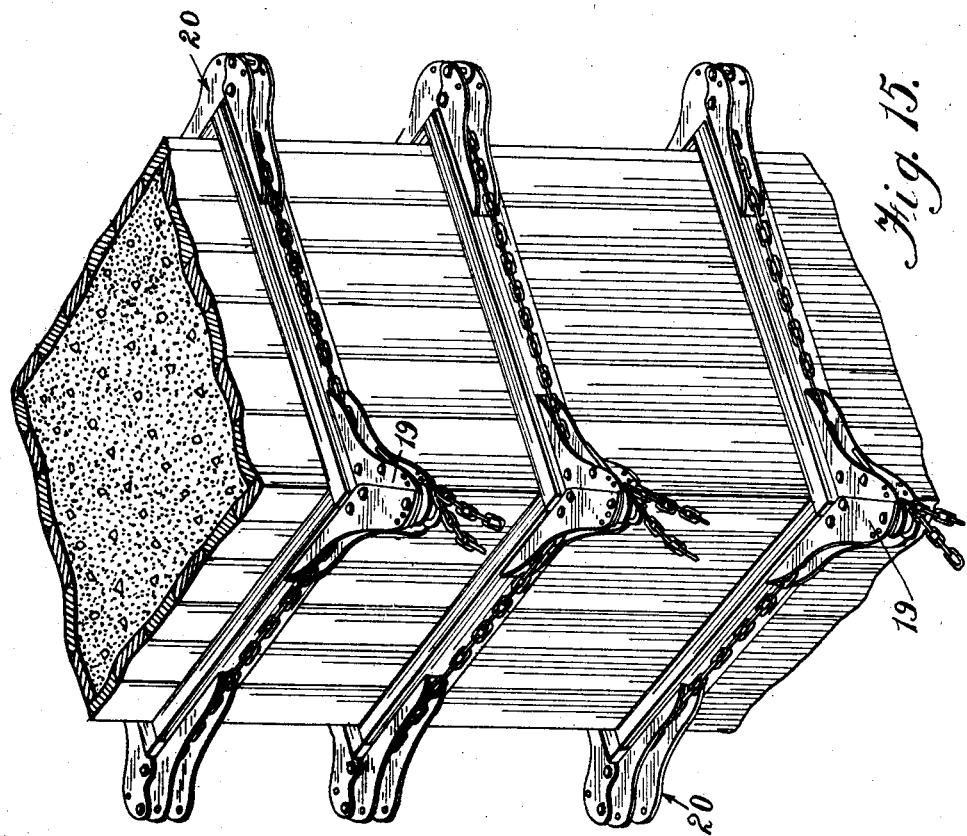
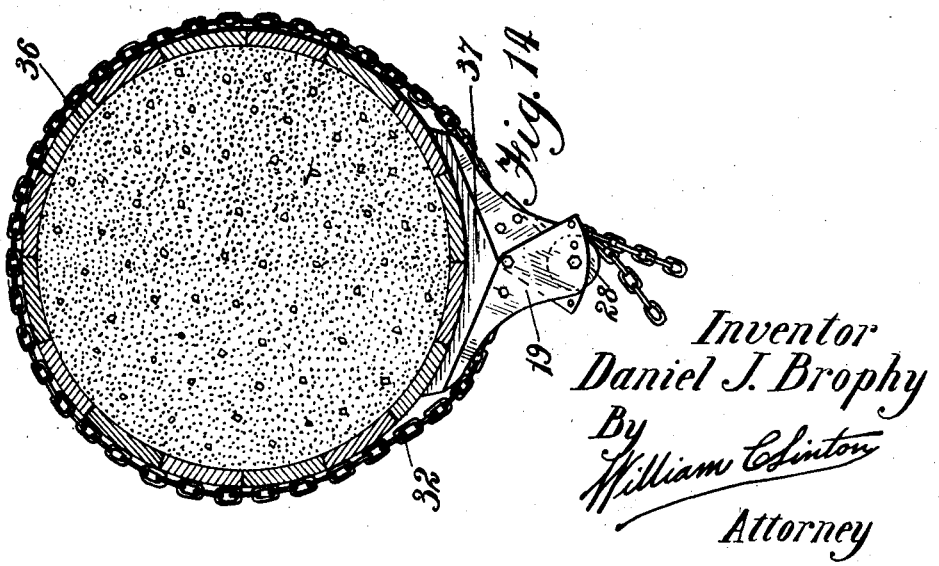

UNITED STATES PATENT OFFICE.

DANIEL JAMES BROPHY, OF MONTREAL, QUEBEC, CANADA.

CLAMPING DEVICE FOR MOLDS.

1,395,553.  Specification of Letters Patent.  Patented Nov. 1, 1921.

Application filed December 27, 1920. Serial No. 433,245.

*To all whom it may concern:*

Be it known that I, DANIEL JAMES BROPHY, a citizen of the United States of America, residing at Montreal, Province of Quebec, Canada, have invented certain new and useful Improvements in Clamping Devices for Molds; and I do hereby declare that the following is a full, clear, and exact description of the invention, such as will enable others skilled in the art to which it appertains to make and use the same.

The present invention relates to new and useful improvements in clamping devices for molds and the like.

The primary object of the invention is the provision of a clamping device for molds or the like, which will engage the various mold sections and hold them in the desired position while the material is being prepared therein and until said material hardens.

Another object of the invention is the provision of a mold clamping device including a plurality of corner members which are adjustable to conform to molds of various shapes.

Another object of the invention is the provision of a mold including a plurality of corner members and means connecting the same whereby a continuous stress can be exerted on said corner members for retaining them tightly in the desired position.

Still another object of the invention is the provision of a mold clamping device including a plurality of adjustable corner members which can be set prior to their use to conform to the various and desired shapes of the molds being used.

A further object of the invention is the provision of a mold clamping device so constructed that the same can be adjusted prior to its use and when drawn to its tightened position will draw the mold to its proper shape so that the sides of the article being molded will be of uniform size and true throughout their lengths and widths.

A still further object of the invention is the provision of a mold clamping device, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the accompanying drawings in which:—

Figure 1 is a horizontal sectional view taken through a mold of the usual construction to which my improved clamping device is applied;

Fig. 2 is a plan view of one of the supplemental corner members;

Fig. 3 is a horizontal sectional view thereof showing the sections adjusted to conform to a mold of hexagonal shape;

Fig. 4 is a similar view showing the sections adjusted to conform to a mold of octagonal shape;

Fig. 5 is an edge view of one of the supplemental corner members;

Fig. 6 is a detail perspective view of one of the adjustable sections of one of the supplemental corner members;

Fig. 7 is a horizontal sectional view taken through the main corner member showing the sections thereof adjusted to conform to a mold of hexagonal shape;

Fig. 8 is a similar view showing the same adjusted to conform to a mold of rectangular shape;

Fig. 9 is a similar view showing the same adjusted to conform to a mold of octagonal shape, and also showing the same for tightening the connecting chain;

Fig. 10 is a detail perspective view of one of the adjustable sections of the main corner member;

Fig. 11 is a transverse sectional view taken on the line 11—11 of Fig. 9;

Fig. 12 is a horizontal sectional view taken on the line 12—12 of Fig. 13; and,

Fig. 13 is a transverse sectional view taken through the drum.

Fig. 14 is a horizontal sectional view of a circular mold showing the invention applied; and Fig. 15 is a perspective view of a mold showing the invention applied thereto.

Referring now to the accompanying drawings by corresponding characters of reference throughout the several views, the numeral 15 designates in general a mold which comprises a plurality of side sections 16, 17 shows the article to be molded which, in the present instance, is in the form of a rectangular building column.

My improved mold clamping device is shown at 18 and comprises a main corner member 19 and a plurality of supplemental corner members 20 which correspond in number to the remaining number of corners of the mold to which the device is to be applied.

The main corner member 19 comprises a pair of plates 21 provided at their inner sides with interlocking ears 22 through which a bolt or other suitable fastening device shown at 23 may be inserted for the purpose of pivotally connecting the plates 21 together so that they may be adjusted as shown in Figs. 7, 8 and 9 to conform to the molds of hexagonal, rectangular, and octagonal shapes.

The plates 21 are provided at their edges with laterally extending reinforcing flanges 24 which extend beyond the inner ends of the plate as shown at 25 and are arranged in overlapping position as clearly shown in Fig. 11. The edges of the extensions 25 are provided with a series of openings 26 through which a bolt 27 may be passed for the purpose of locking the plates 21 in their various adjusted positions shown in Figs. 7, 8 and 9.

A drum 28 is journaled on the bolt 27 and comprises a circular body portion 29 having flanges 30 between which are positioned hooks 31 which extend from the body portion 29 for the purpose of engaging the links of a chain 32, the purpose of which will be later explained.

The flanges 30 are provided with radial openings 33 for the insertion of a suitable bar or other operating device shown at 34 by means of which the said drum 28 can be rotated.

An additional locking bar 35 may likewise be inserted in the openings 33 for engagement with the stop 36 to prevent any undesired retrograde movement of the drum 28.

The supplemental corner members 20 each include a pair of plates 37 reinforced by the lateral flanges 38 which are extended inwardly at 39 and correspond to the extended portions 25 of the flanges 24. These extensions 39 are provided with alining apertures 40 for the reception of a bolt 41 whereby the plates 37 may be locked in their adjusted positions as shown in Figs. 2, 3 and 4 to conform to the shape of rectangular, hexagonal and octagonally shaped molds.

The inner faces of the plates 37 are provided with interlocking ears 42 which correspond to the before described ears 22, and a pivot member 43 passes through these said ears 42 for pivotally connecting the plates 37 together. Each of the plates 37 is provided between its flanges 38 and adjacent its outer end with a hook 44 for engagement with the chain 32 for holding the corner members 20 in equi-spaced relation relative to each other.

The device is used as follows:—

The main and supplemental corner sections 19 and 20 are first set or adjusted to conform to the shape of the mold which for purposes of illustration is shown of a rectangular shape.

The chain 32 is then engaged in the hooks 44 so that the members 20 are spaced the desired distance apart and the sections 16 of the mold are then set up and the corner members 19 and 20 applied thereto. The links of the chain 32 are next engaged by the hooks 31 and the drum 28 rotated by means of the bar 34 until the corner members 19 and 20 are drawn tightly into engagement with the mold sections which are thereby forced to their proper position. When these sections are drawn to the desired tightness, the bar 35 is placed in one of the openings 33 so that the intermediate portion thereof engages the stop 36, which folds the drum against any undesired rotation and locks the corner members 19 and 20 in their proper position.

The mold 15 can then be filled with the material 17 which is allowed to harden.

Referring to Fig. 14 of the drawings which illustrates a modified form of the invention, a circular mold 36 is employed around which the chains 32 are passed. In this form the members 20 are dispensed with and only the one member 19 employed which is held by a block 37 the inner side of which is curved to conform to the curvature of the mold 36.

From the foregoing description taken in connection with the accompanying drawings, it will be manifest, that a clamping device for molds is provided which will fulfil all of the necessary requirements of such a device.

It should be understood in this connection that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

In a device of the character described, the combination of a plurality of supplemental corner members, each of said corner members comprising adjustable pivoted plates, flanges formed upon said plates, means engaging the flanges for locking the plates in adjusted positions, chain hooks provided upon said supplemental corner members, a chain passing around said corner members and engaging said hooks, a main adjustable corner member, said member comprising pivoted plates, flanges formed upon the pivoted plates of the main corner member, means engaging the flanges of the main corner member for retaining the plates of the main corner member in their adjusted positions, a drum journaled in said main corner member, hooks provided upon said drum for engaging said chain, flanges having openings therein formed upon said drum, an operating bar engageable in the openings of the flanges for rotating said drum and drawing the corner members together, a locking bar engageable in the openings of the flanges, and a stop for engagement with the locking bar to prevent rotation of the drum.

In witness whereof I have hereunto set my hand.

DANIEL JAMES BROPHY.